United States Patent
Keast

(10) Patent No.: US 8,635,291 B2
(45) Date of Patent: Jan. 21, 2014

(54) COMMUNICATION DEVICE AND METHOD FOR OVERRIDING A MESSAGE FILTER

(75) Inventor: James Patrick Keast, Bedford (CA)

(73) Assignee: BlackBerry Limited, Waterloo, ON (CA)

( * ) Notice: Subject to any disclaimer, the term of this patent is extended or adjusted under 35 U.S.C. 154(b) by 164 days.

(21) Appl. No.: 13/030,348

(22) Filed: Feb. 18, 2011

(65) Prior Publication Data
US 2012/0215854 A1 Aug. 23, 2012

(51) Int. Cl.
*G06F 15/16* (2006.01)

(52) U.S. Cl.
USPC .......................................... 709/206; 709/207

(58) Field of Classification Search
USPC .......................................... 709/206–207, 229
See application file for complete search history.

(56) References Cited

U.S. PATENT DOCUMENTS

| | | | |
|---|---|---|---|
| 7,222,158 B2 * | 5/2007 | Wexelblat | 709/206 |
| 7,640,313 B2 * | 12/2009 | Rounthwaite et al. | 709/206 |
| 2003/0187937 A1 | 10/2003 | Yao et al. | |
| 2008/0010353 A1 | 1/2008 | Rounthwaite et al. | |
| 2008/0086533 A1 * | 4/2008 | Neuhauser et al. | 709/206 |
| 2008/0183825 A1 * | 7/2008 | Alicherry et al. | 709/206 |
| 2008/0270540 A1 | 10/2008 | Larsen | |
| 2008/0301250 A1 * | 12/2008 | Hardy et al. | 709/207 |
| 2010/0017476 A1 | 1/2010 | Shue | |
| 2010/0174788 A1 * | 7/2010 | Vitaldevara et al. | 709/206 |
| 2011/0183650 A1 * | 7/2011 | McKee | 455/413 |
| 2011/0302255 A1 * | 12/2011 | Miller et al. | 709/206 |

FOREIGN PATENT DOCUMENTS

| | | |
|---|---|---|
| WO | 2006/113849 A2 | 10/2006 |
| WO | 2008/061096 A2 | 5/2008 |

OTHER PUBLICATIONS

Pegasus—Global whitelist—Source: http://community.pmail.com/pmail/PegasusMailReleaseNotes.aspx—Retrieved from the Internet on Feb. 17, 2011.
Challenge-Response Spam Filtering—Source: http://en.wikipedia.org/wiki/Challenge-response_spam_filtering—Retrieved from the Internet on Feb. 17, 2011.
Outlook Express "The View Filter" and "Watch converstion and ignore conversation" Source: http://support.microsoft.com/kb/220591 Retrieved from the Internet on Feb. 18, 2011.
Mozilla messaging supports Watched Threads Source: http://support.mozillamessaging.com/bg/kb/Menu+References#Message_Filters Retrieved from the Internet on Feb. 18, 2011.
European Patent Application No. 11155022.4 Search Report mailed date Jul. 6, 2011.

* cited by examiner

*Primary Examiner* — Abdullahi Salad
(74) *Attorney, Agent, or Firm* — Perry + Currier

(57) ABSTRACT

A communication device and method for overriding a message filter are provided. A first message is transmitted from the communication device to a communication network, the first message associated with a filtering override condition stored at a memory device. A second message is received from the communication network, the second message meeting a filtering condition stored in the memory device such that an alert device is not triggered to provide an alert of second message. The second message us determined to be received in response to the first message associated the filtering override condition, and in response, the alert device is triggered to provide the alert of the second message.

20 Claims, 7 Drawing Sheets

401

403 {
Larry,

I will need a few days to get those figures together. I will send as soon as possible.

405 {
From: Larry Smith
Sent: November 26, 2009 10:31
To: David Johnson
Subject: November Sales
Importance: High ← 409

407 {
Dear Bill,

I need November's sales figures as soon as possible. Please send quickly.

Regards,

Larry

VP Sales

COMMUNICATION DEVICE AND METHOD FOR OVERRIDING A MESSAGE FILTER

FIELD

The specification relates generally to a communication device, and specifically to a communication device and method for overriding a message filter.

BACKGROUND

The evolution of computers is currently quite active in the mobile device environment. It is now well-known to include applications for filtering messages at communication devices. More recently, there has been a veritable explosion of the number and type of applications that are configured to the unique form factors and computing environments of communication devices.

BRIEF DESCRIPTIONS OF THE DRAWINGS

Implementations are described with reference to the following figures, in which:

FIG. 4 depicts an example e-mail not marked as urgent but which nonetheless triggers an alert device to provide an alert, according to non-limiting implementations.

DETAILED DESCRIPTION

Figure 1:
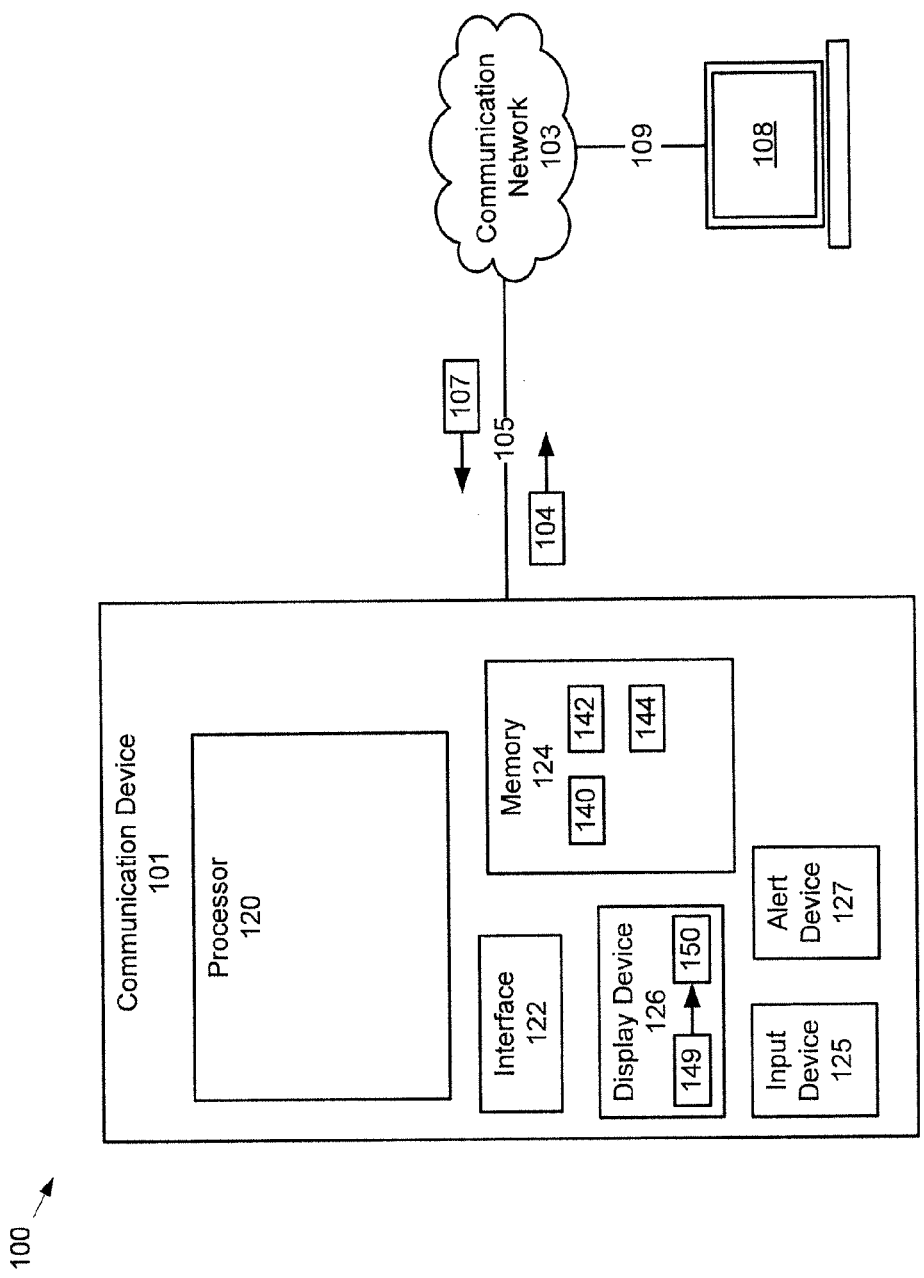
FIG. 1 depicts a system including a communication device for overriding a message filter, according to non-limiting implementations.

An aspect of the specification provides a method comprising: transmitting a first message from a communication device to a communication network via a communication interface, the first message associated with a filtering override condition stored at a memory, the communication device comprising a processor, the memory, the communication device and an alert device; receiving a second message from the communication network via the communication interface, the second message meeting a filtering condition stored in the memory such that the alert device is not triggered to provide an alert of the second message; determining that the second message is received in response to the first message associated the filtering override condition; and, in response, triggering the alert device to provide the alert of the second message.

The method can further comprise generating the filtering override condition using a GUI for configuring filtering conditions.

The method can further comprise tagging the first message with an indication that the first message is associated with the filtering override condition. Determining that the second message is received in response to the first message associated with the filtering override condition can comprise determining that the second message comprises the indication. The second message can comprise the indication in at least one of metadata, text in the second message, and in header data.

The method can further comprise storing an identifier of the first message in a white list stored in the memory indicating that the first message is associated with the filtering override condition. Determining that the second message is received in response to the first message associated the filtering override condition can comprise determining that the second message is associated with the identifier stored in the white list. The identifier can comprise at least one of a message identifier, a thread identifier and a subject line of the first message.

The first message can comprise at least one of an e-mail, a text message, an SMS (Short Message Service) message, an MMS message (Multimedia Messaging Service), and a telephony message.

The communication device can comprise a mobile communication device.

Another aspect of the specification can comprise a communication device comprising: a processor, a memory, a communication interface and an alert device, the processor configured to: transmit a first message to a communication network via the communication interface, the first message associated with a filtering override condition stored at the memory; receive a second message from the communication network via the communication interface, the second message meeting a filtering condition stored in the memory such that the alert device is not triggered to provide an alert of second message; determine that the second message is received in response to the first message associated the filtering override condition; and, in response, trigger the alert device to provide the alert of the second message.

The processor can be further configured to generate the filtering override condition using a graphic user interface (GUI) for configuring filtering conditions.

The processor can be further configured to tag the first message with an indication that the first message is associated with the filtering override condition. To determine that the second message is received in response to the first message associated with the filtering override condition, the processor can be further configured to determine that the second message comprises the indication. The second message can comprise the indication in at least one of metadata, text in the second message, and in header data.

The processor can be further configured to store an identifier of the first message in a white list stored in the memory indicating that the first message is associated with the filtering override condition. To determine that the second message is received in response to the first message associated the filtering override condition, the processor can be further configured to determine that the second message is associated with the identifier stored in the white list. The identifier can comprise at least one of a message identifier, a thread identifier and a subject line of the first message.

The first message can comprise at least one of an e-mail, a text message, an SMS (Short Message Service) message, an MMS message (Multimedia Messaging Service), and a telephony message.

The communication device can comprise a mobile communication device.

The display device can comprise the alert device.

A further aspect of the specification comprises a computer program product, comprising a computer usable medium having a computer readable program code adapted to be executed to implement a method at a communication device comprising a processor, a memory, a communication interface and an alert device, the method comprising: transmitting a first message from the communication device to a communication network via the communication interface, the first message associated with a filtering override condition stored at the memory; receiving a second message from the communication network via the communication interface, the second message meeting a filtering condition stored in the memory such that the alert device is not triggered to provide an alert of second message; determining that the second message is received in response to the first message associated the filtering override condition; and, in response, triggering the alert device to provide the alert of the second message.

The computer usable medium can be non-transitory.

FIG. 1 depicts a system 100 including a communication device 101 for overriding a message filter, according to non-limiting implementations. Communication device 101 (also be referred to hereafter as device 101) is generally enabled for communication with a communication network 103 (referred to hereafter as network 103) via a link 105, such that a first message 104 can be transmitted to network 103, and a second message 107 can be received from network 103. For example first message 104 can be transmitted to a remote communication device 108 via network 103 and a link 109, and second message 107 can be received from remote communication device 108 in response.

Device 101 comprises a processing unit 120 interconnected with a communication interface 122, a memory device 124, an input device 125, a display device 126 and an alert device 127. Memory device 124 stores filtering condition data 140 comprising at least one filtering condition (filtering condition data 140 also referred to hereafter as filtering condition 140 and/or condition 140) and filtering override condition data 142 comprising at least one filtering override condition (filtering override condition data 142 also referred to hereafter as filtering override condition 142 and/or condition 142).

In general, condition 140 comprises data for filtering messages such as message 107. For example, condition 140 can comprise at least one rule filtering messages, including but not limited to rules for placing messages into different inboxes in a messaging application 144 (also referred to hereafter as application 144) stored and processed at device 101, and/or rules for triggering alert device 127 to provide an alert of a given message.

For example, condition 140 can comprise at least one filtering rule; in this state only messages meeting the filter rule will be delivered (e.g. to an inbox), resulting in an alert. Other messages will be filtered. Hence, when a message is initiated (e.g. first message 104), replies (e.g. second message 107) to that message will not be delivered (e.g. to the inbox), nor will an alert be generated if the message does not meet the filtering rule, even it is generally preferred that replies to the initiated message be received. This problem is resolved by at least one condition for overriding the filtering rule (i.e. condition 142), such that all messages in response to a given messages transmitted from device 101 while the filtering rule(s) are in place should be allowed through the filter and cause an alert to be triggered. In effect the filtering rule(s) are modified dynamically such that replies to such messages are delivered (i.e. the filtering rule(s) are dynamically overridden).

For example, in some non-limiting implementations, condition 140 causes messages that are tagged as being "urgent" to be placed in, for example, a main inbox at messaging application 144 and/or trigger alert device 127 to provide an alert for messages tagged as being urgent. Conversely, messages that are not tagged as "urgent" can be placed in a designated folder in a suitable data structure (e.g. as in data structure 602 of FIG. 6 described below), rather than a main inbox and/or alert device 127 is not triggered to provide an alert. It is appreciated that such rules can comprise any suitable format: for example such rules can be directed to all messages tagged as being urgent, or all messages NOT tagged as being urgent. Furthermore, such rules can be received in any suitable manner, for example via a GUI (graphical user interface associated with application 144), and/or via input device 125 and/or via communication interface 122. While provided examples are directed to messages tagged as being urgent, condition 140 can comprise any suitable rules for filtering messages, including but not limited to messages associated with a given domain, a given address, given words, given user identifiers, tagged with a given level of importance, tagged with a given level of sensitivity, and/or a combination, and the like.

Furthermore, condition 142 can comprise any suitable rule for overriding condition 140 when first message 104 is associated with condition 142 and second message 107 meets condition 140, as will be described below. In specific non-limiting example implementations, condition 142 can comprise a rule for causing alert device 127 to be triggered to provide an alert of second message 107 when second message 107 is received in response to first message 104 associated with condition 140.

In general, device 101 comprises any suitable electronic communication device for processing application 144, determining whether first message 104 is associated with condition 140, and determining whether second message 107 is associated with condition 142. Device 101 can include, but is not limited, to any suitable combination of computing devices, communication devices, desktop computing devices, laptop computing devices, portable computing devices, mobile electronic devices, portable communication devices, mobile communication devices, PDAs (personal digital assistants), cellphones, smartphones and the like. Other suitable communication devices are within the scope of present implementations.

Network 103 can comprise any suitable combination of wired or wireless networks as desired, including but not limited to cell phone networks, 1X networks, UMTS (Universal Mobile Telecommunications System) networks, CDMA (code division multiple access) networks, GSM (Global System for Mobile communications) networks, EVDO (Evolution-Data Optimized) networks, HSPA (High Speed Packet Access) networks, 3GPP ($3^{rd}$ Generation Partnership Project) networks, 3G ($3^{rd}$ Generation) networks, EDGE (Enhanced Data rates for GSM Evolution) networks, Wide Area Networks (WAN), local area networks (LAN), packet based networks, the Internet, analog networks, the PSTN (public switched telephone network), WiFi networks, WiMax networks and the like.

Link 105 comprises any suitable link between device 101 and network 103, including any suitable combination of wired and/or wireless links, and/or wired and/or wireless devices, including but not limited to any suitable combination of wired links, cables, USB (universal serial bus) cables, serial cables, wireless links, cell-phone links, wireless data links, Bluetooth links, NFC (near field communication) links, WiFi links, WiMax links, packet based links, access points, and the like, and/or a combination. Other suitable communication link and/or devices are within the scope of present implementations.

Link 109 can be similar to link 105.

Processing unit 120 (also referred to hereafter as processor 120) comprises any suitable processor, or combination of processors, including but not limited to a microprocessor, a central processing unit (CPU) and the like. Other suitable processing units are within the scope of present implementations. It is appreciated that processing unit 120 is configured to process application 144 and determine whether first message 104 is associated with condition 140, and determine whether second message 107 is associated with condition 142.

Communication interface 122 comprises any suitable communication interface, or combination of communication interfaces. In particular communication interface 122 is configured to communicate with network 103 via link 105 using any suitable wired and/or wireless protocol. Accordingly, communication interface 122 (which will also be referred to as interface 122 hereafter) is configured to communicate according to any suitable protocol which is compatible with link 105, including but not limited to wired protocols, USB (universal serial bus) protocols, serial cable protocols, wireless protocols, cell-phone protocols, wireless data protocols, Bluetooth protocols, NFC (near field communication) protocols, packet based protocols, Internet protocols, analog protocols, PSTN (public switched telephone network) protocols, WiFi protocols, WiMax protocols and the like, and/or a combination. Other suitable communication interfaces and/or protocols are within the scope of present implementations.

Input device 125 is generally configured to receive input data, and can comprise any suitable combination of input devices, including but not limited to a keyboard, a keypad, a pointing device, a mouse, a track wheel, a trackball, a touchpad, a trackpad, a touch screen and the like. Other suitable input devices are within the scope of present implementations.

Memory device 124 can comprise any suitable memory device, including but not limited to any suitable one of, or combination of, volatile memory, non-volatile memory, random access memory (RAM), read-only memory (ROM), Erase Electronic Programmable Read Only Memory (EEPROM), Flash Memory hard drive, optical drive, flash memory, magnetic computer storage devices (e.g. hard disks, floppy disks, and magnetic tape), optical discs, removable memory, and the like. Other suitable memory devices are within the scope of present implementations. In particular, memory device 124 is configured to store conditions 140, 142, and applications 144.

Display device 126 comprises circuitry 149 for generating renderings of data, for example a rendering 150 of application 144, as will be described below. Display device 126 can include any suitable one of or combination of CRT (cathode ray tube) and/or flat panel displays (e.g. LCD (liquid crystal display), plasma, OLED (organic light emitting diode), capacitive or resistive touchscreens, and the like). Circuitry 149 can include any suitable combination of circuitry for controlling the CRT and/or flat panel displays etc., including but not limited to display buffers, transistors, electron beam controllers, LCD cells, plasmas cells, phosphors etc. In particular, display device 126 and circuitry 149 can be controlled by processing unit 120 to generate rendering 150.

Alert device 127 comprises any suitable alert device including but not limited to visual alert devices, lights, LEDs (light emitting diodes), audio alert devices, speakers, vibration alert devices, and the like. In some non-limiting implementations, display 126 can comprise alert device 127, such that alert device comprises a subset of pixels at display 126 for providing an alert, such as an icon and/or text associated with an alert (e.g. a envelope icon and/or text such as "You've got mail".).

Figure 2:
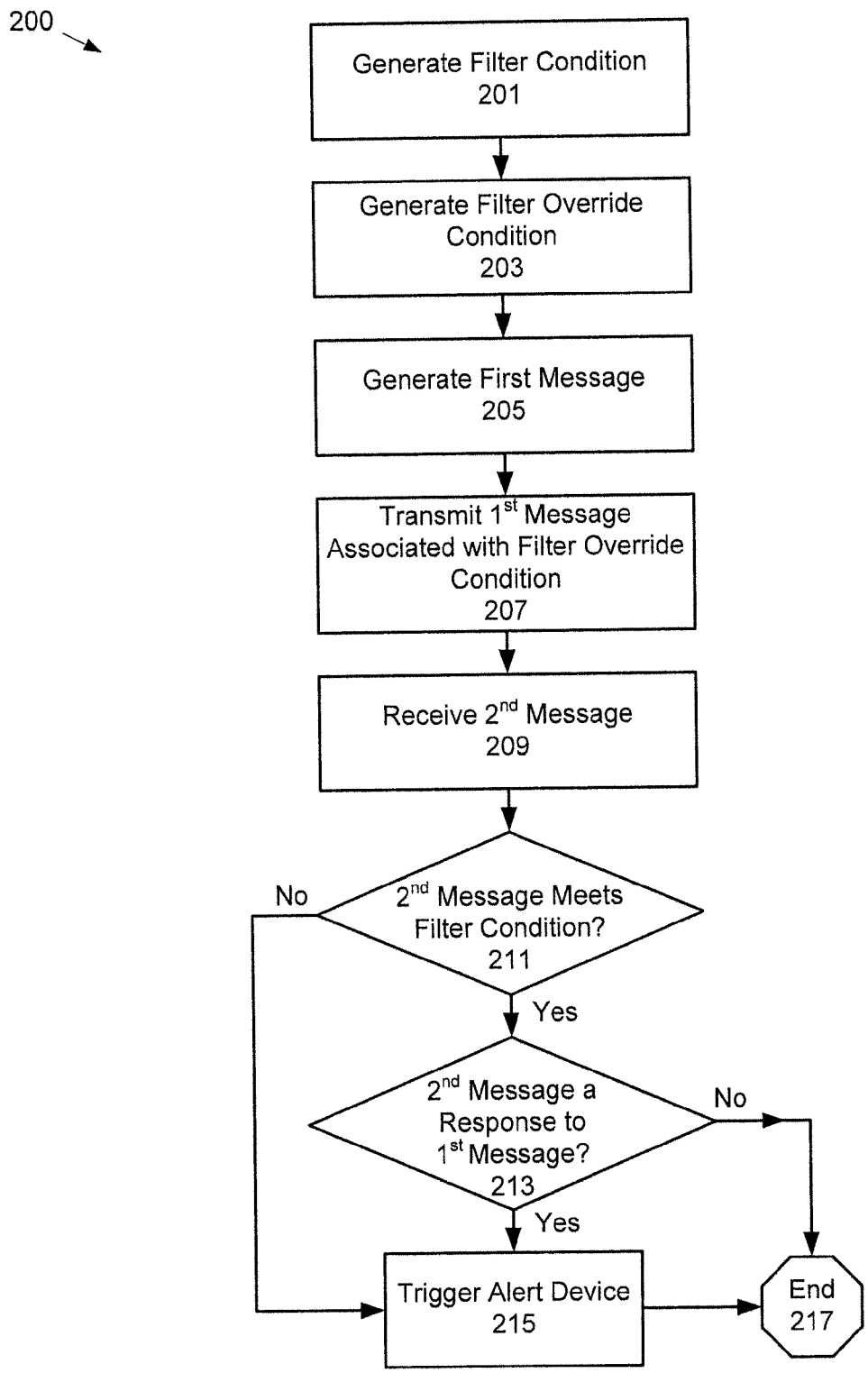
FIG. 2 depicts a method for overriding a message filter, according to non-limiting implementations.

Attention is now directed to FIG. 2 which depicts a method 200 for overriding a message filter at a communication device. In order to assist in the explanation of method 200, it will be assumed that method 200 is performed using device 101. Furthermore, the following discussion of method 200 will lead to a further understanding of device 101 and its various components. However, it is to be understood that device 101 and/or method 200 can be varied, and need not work exactly as discussed herein in conjunction with each other, and that such variations are within the scope of present implementations.

At block 201 condition 140 is generated, and at block 203 condition 142 is generated, for example in a GUI as described below. For example, condition 140 can comprise "Only provide alerts for urgent messages", and override condition 142 can comprise "Provide alerts to responses to urgent transmitted message". At block 205, first message 104 is generated, and block 207 first message 104 is transmitted. It is appreciated that first message 104 is associated with override condition 142: for example, first message 104 can be tagged as "Urgent", hence responses to first message 104 can trigger alert device 127 to provide an alert of such response.

However, it is appreciated that first message 104 being tagged as "Urgent" is a non-limiting implementation. Indeed, in other implementations, first message 104 need not be tagged as "Urgent" (or not tagged in any other suitable manner); rather first message 104 is merely associated with filter override condition 142. For example, in some implementations, filter condition 140 can comprise only providing alerts for a given user and/or list of users, and first message 104 can be to a user NOT on the list. However, filter override condition 142 can comprise a user NOT on the list (either the user to whom first message 104 is originally sent or another user). In any event, replies (e.g. second message 107) to first message 104 override filter condition 140 when from a user referenced in filter override condition 142. Further, the replies can be direct replies and/or replies to a forward of first message 104 from the original user first message 104 was originally sent to, to a second user, the second user being referenced in the filter override condition.

Continuing with method 200 and the non-limiting example of "Urgent" messages, at block 209, second message 107 is received and at block 211 it is determined whether second message 107 meets condition 140. For example, when second message 107 is tagged as "Urgent", at block 211 it is determined that second message 107 is NOT to be filtered based on condition 140, and at block 215 alert device 127 is triggered to provide an alert of second message 107.

However, when second message 107 is NOT tagged as "Urgent", at block 211 it is determined that second message 107 is to be filtered based on condition 140. In other words, when second message 107 is NOT urgent, an alert for second message 107 is NOT provided (i.e. alert device 127 is NOT triggered to provide an alert for second message 107).

However, at block 213, it is determined whether second message 107 is received in response to first message 104. If not, then method 200 ends at block 217. However when second message 107 comprises a reply to first message 104, then at block 215 alert device 127 is triggered to provide an alert of second message 107.

Hence, when an urgent message is transmitted and a response to the urgent message is received, the response NOT tagged as urgent, an alert for the response is generated regardless of any message filters that prevent alerts for non-urgent messages.

In other words, method 200 enables generation of alerts for responses to given messages that meet condition 142, regardless of any message filters that prevent alerts from being provided for the responses; hence method 200 overrides the message filters.

Determining whether second message 107 is received in response to first message 104 at block 213 can be performed in any suitable manner. For example, attention is directed to FIG. 3, which is substantially similar to FIG. 1, with like elements having like numbers. However, in FIG. 3, first message 104 is tagged with an indication 301 that first message is associated with filtering override condition 142. For example, indication 301 can comprise at least one of metadata, text, and/or header data indicating that first message 104 is "Urgent". Hence, at communication device 108, first message 104 can be indicated as "Urgent" in an in-box in a messaging application.

Alternatively, first message 104 need not be tagged as urgent; rather, indicator 301 is configured to indicate that responses to first message 104 meet override condition 142 regardless of filter condition 140.

However, in these implementations, regardless of the urgency level of second message 107 produced at communication device 108, communication device 108 is configured to place indicator 301, or a portion thereof, in second message 107 prior to transmitting second message 107. Indicator 301 in second message 107 can comprises at least one of metadata, text, and/or header data indicating that second message 107 is transmitted in response to a message tagged as "Urgent". Alternatively, indicator 301 comprises at least one of metadata, text, and/or header data indicating that responses to first message 104 meet override condition 142 regardless of filter condition 140.

In some non-limiting implementations, indication 301 can be included as text in second message 107. For example, second message 107 can include the body of first message 104 in a thread below the body of second message 107; in these implementations, the body of first message 104 can be preceded by text indicative of header data of first message 104 which can include the text: "Importance: High" and/or "Importance: Urgent". A non-limiting example of such implementations is provided in FIG. 4, which depicts an example body 401 of second message 107, with text 403 comprising the text of second message 107, text 405 indicative of header data of first message 104, and text 407 comprising the body of first message 104. In FIG. 4, text 405 comprises an indication 409 that first message 104 tagged as "Urgent".

Figure 3:
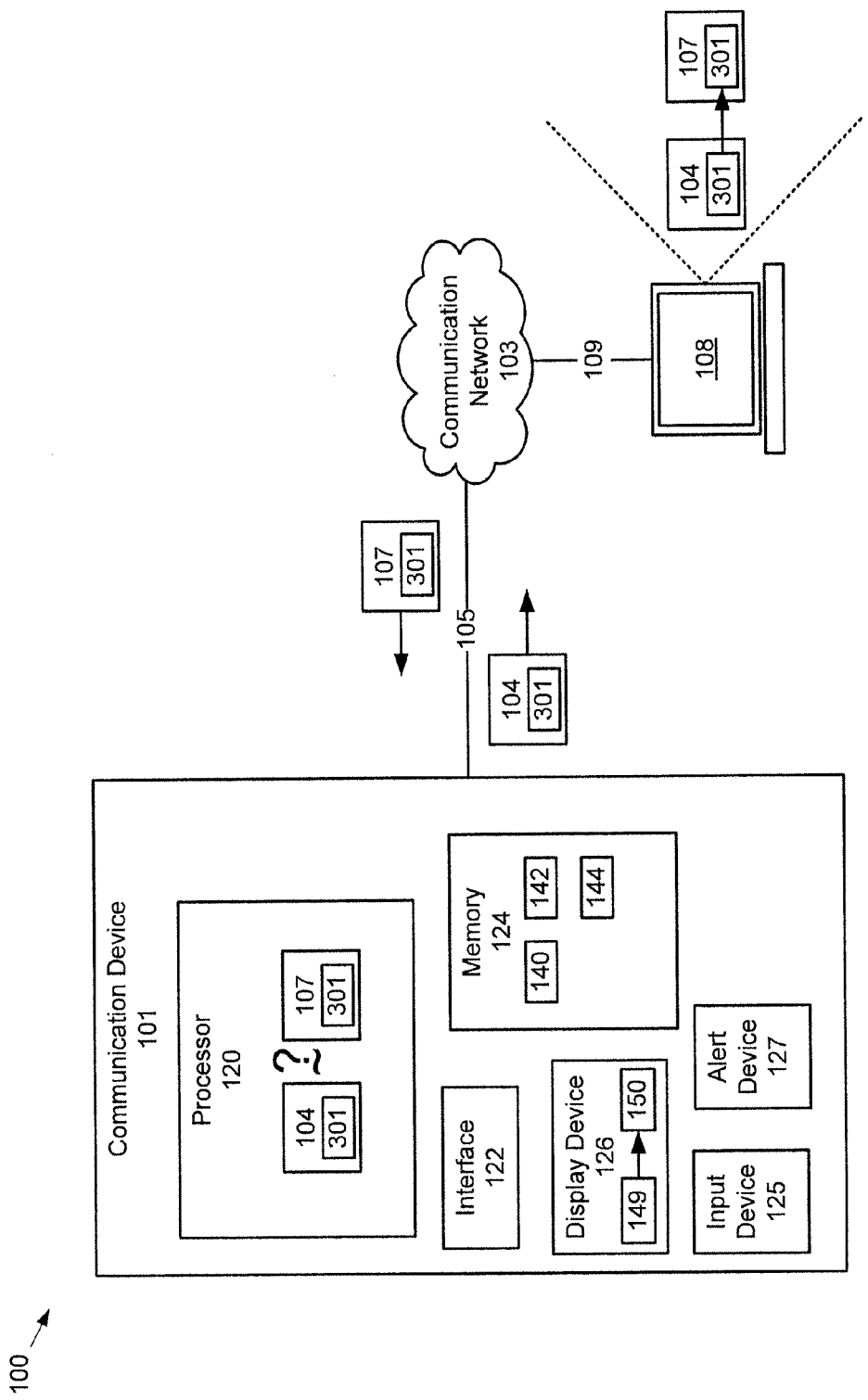
FIG. 3 depicts a system including a communication device for overriding a message filter, according to non-limiting implementations.

Hence, in these implementations, determining that second message 107 is received in response to first message 104 associated with filtering override condition 142 comprises determining that second message comprises indication 301. Such a determination can be performed when processing unit 120 performs a comparison between at least one of metadata, text and header data of first message 104 and at least one of metadata, text and header data of second message 107, as depicted in FIG. 3.

Figure 5:
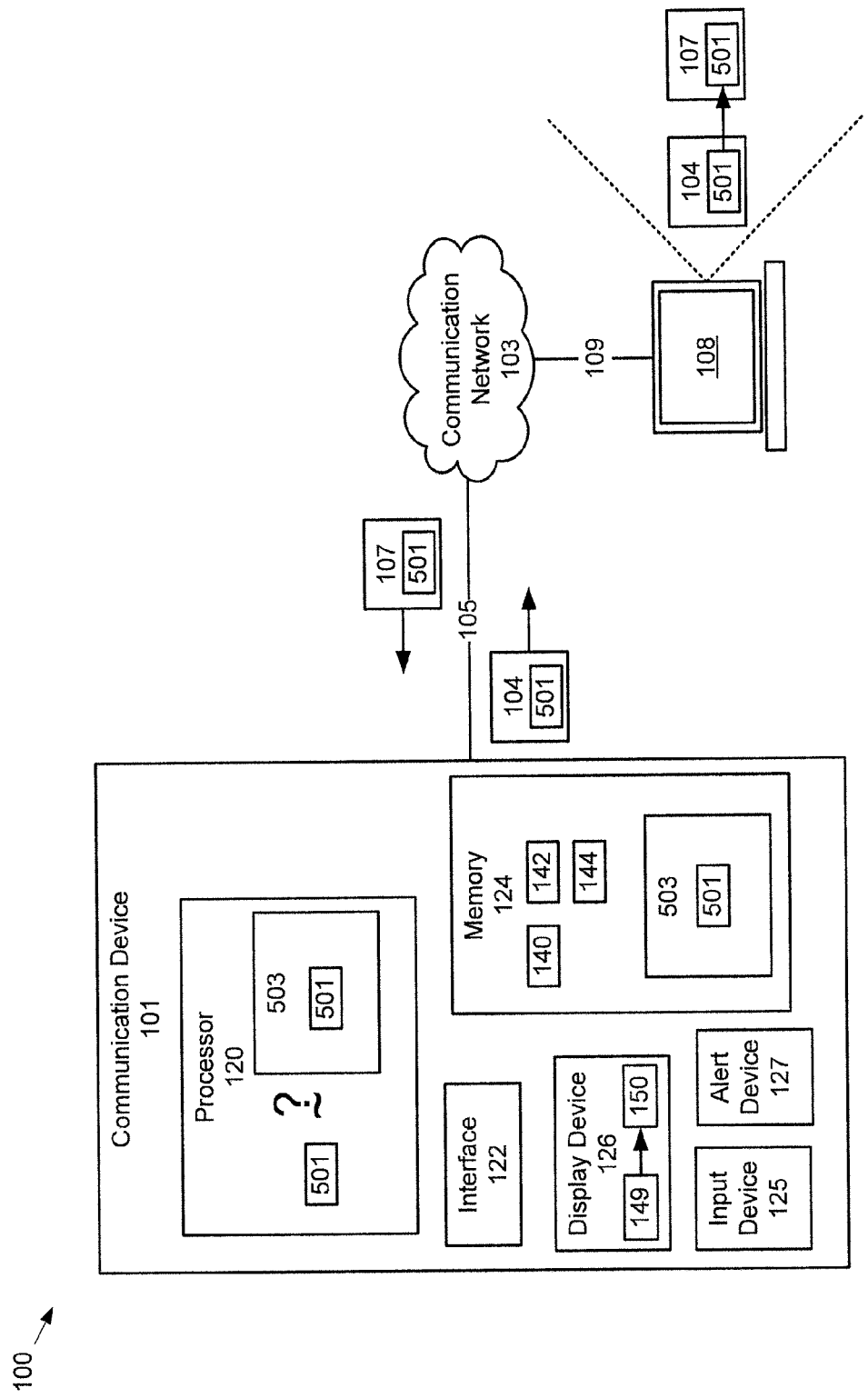
FIG. 5 depicts a system including a communication device for overriding a message filter, according to non-limiting implementations.

In further non-limiting implementations, as depicted in FIG. 5, method 200 can further comprising storing an identifier 501 of first message 104 in a white list 503 stored in memory device 124, indicating that first message 104 is associated with filtering override condition 142. In other words, white list 503 is maintained to store identifiers of messages transmitted from device 101 to which alerts for responses are to be generated regardless of any message filters that prevent alerts for messages from being provided for the responses.

Hence, in these implementations, determining that second message 107 is received in response to first message 104 associated with filtering override condition 142 at block 213 of method 200 comprises determining that second message 107 is associated with identifier 501 stored in white list 503. In non-limiting implementations, identifier 501 can comprises at least one of a message identifier, a thread identifier and a subject line of first message 104, and/or any other suitable identifier. For example, in implementations where identifier 501 comprises a message identifier and/or a thread identifier, first message 104 can also comprise the message identifier and/or a thread identifier (e.g. as metadata similar to metadata implementations of indicator 301), which is returned in second message 107. A comparison is then made between the returned message identifier and/or thread identifier (e.g. identifier 501) and white list 503 to determine whether returned message identifier and/or thread identifier is on white list 503.

Alternatively, in implementations where identifier 501 comprises a subject line of first message 104, the subject line of second message 107 can comprise a similar subject line. For example, when the subject line of first message 104 comprises "November Sales", then the text "November Sales" is stored in white list 503. Further, the subject line of second message 107 can comprise "re: November Sales", and hence as the text "November Sales" is in both white list 503 and in second message 107, second message 107 is determined to be received in response to first message 104 associated with filtering override condition 142.

Figure 6:
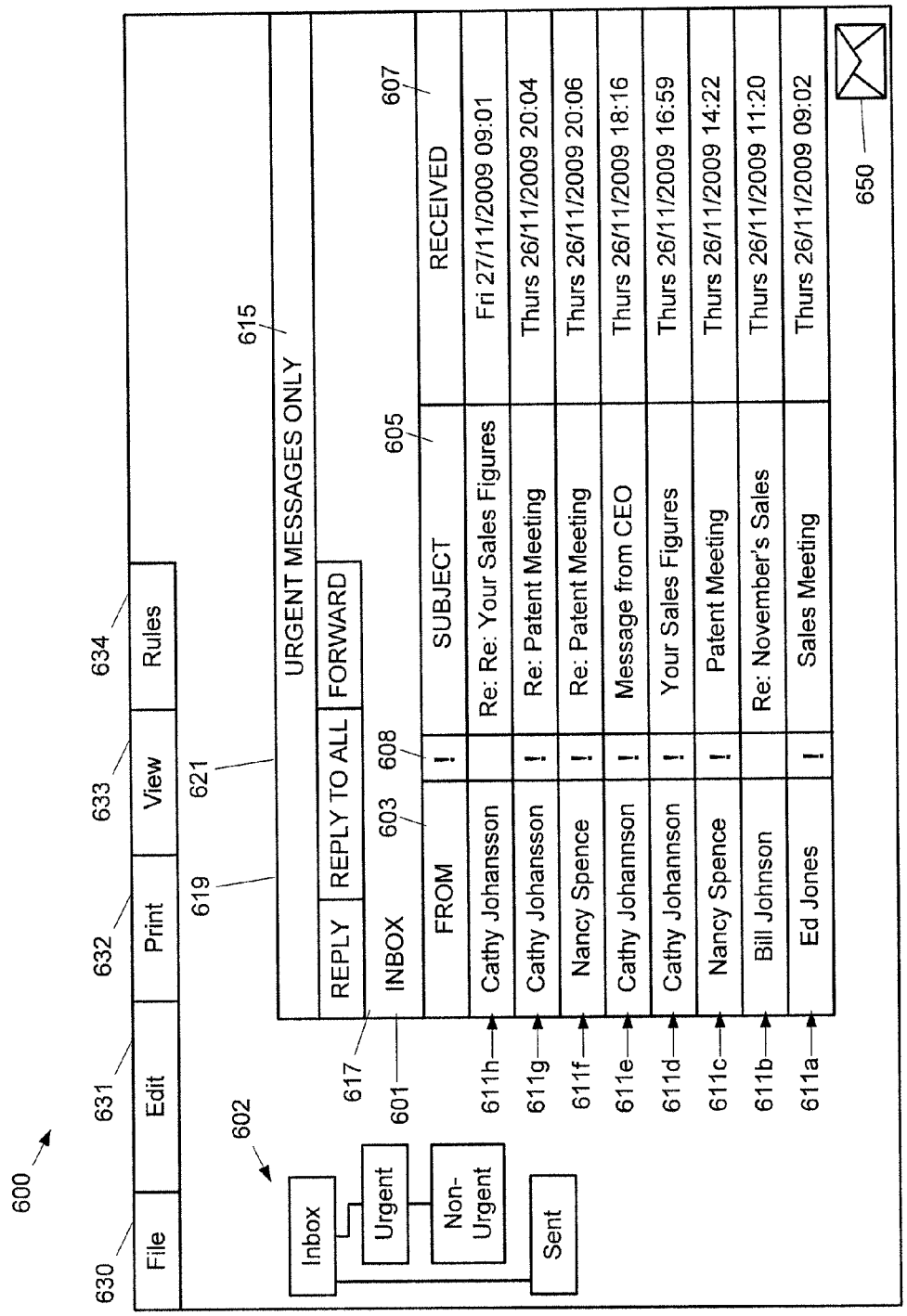
FIG. 6 depicts a Graphic User Interface (GUI) of a messaging application, according to non-limiting implementations.

Attention is directed to FIG. 6 which depicts a representation 600 of messaging application 144, according to non-limiting implementations, representation 600 provided at display 126; representation 150 can hence comprise representation 600. It is appreciated from FIG. 6 that representation 600 of application 144 comprises a representation 601 of an "INBOX" for providing indications of message data, such as second message 107, and optionally a representation 602 of a data structure of various folders (e.g. "Inbox", "Urgent", "Non-Urgent", "Sent") for storing received and transmitted messages, as well as sorting messages based on importance (e.g. Urgent or Non-Urgent).

Representation 601 can comprise a list of message data received from various network addresses, as indicated in a field 603 ("FROM"), on various subjects, as indicated in a filed 605 ("SUBJECT"), as well a field 607 for indicating when the message data was received ("RECEIVED"). The level of urgency of each message is provided in an urgency field 608 ("!").

It is understood that the data in field 603 can comprise an alias of an underlying network address: for example "Cathy Johansson" can represent a network address of remote communication device 108. Though not depicted, it is further understood that further message data, such as a body of an e-mail, can be provided in representation 150 when input data is received indicating that a given set of message data has been chosen for opening (e.g. a message in the list in representation 601 is clicked on using a pointing device). It is furthermore understood that each line 611a-611h (collectively lines 611 and generically a line 611) of representation 601 corresponds to a different message, similar to second message 107.

It is understood that representation 601 of application 144 can further comprise a header 615 and virtual buttons 617, 619, 621 which, when actuated, can cause processing unit 122 to respectively initiate a "REPLY", a "REPLY TO ALL", or a "FORWARD" to/of a highlighted message corresponding to given line 211.

Figure 7:
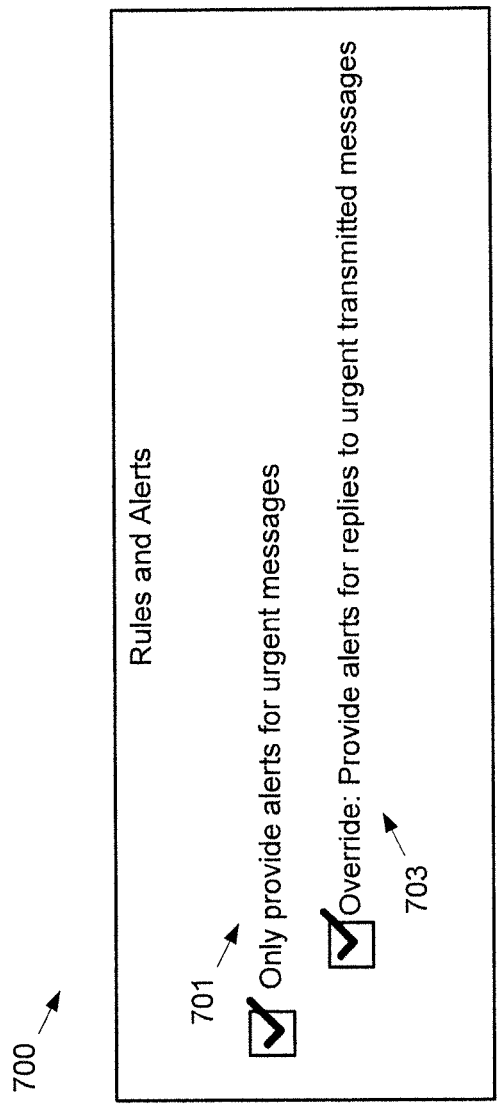
FIG. 7 depicts a GUI for generating a filter condition and a filter override condition, according to non-limiting implementations.

Representation 600 can further comprise virtual buttons 630, 631, 632, 633 which, when actuated, can cause processing unit 122 to respectively "FILE" a given message, "EDIT" a given message, "PRINT" a given message", and configure how representation of inbox 601 is to be viewed via "VIEW". Representation 600 can further comprise a virtual buttons 34 which, when actuated, can cause processing unit 122 to provide a graphic user interface (GUI) 700 for configuring filtering conditions, as depicted in FIG. 7 according to non-limiting implementations. GUI 700 comprises several selectable options, including an option 701 for providing alerts only for urgent messages, and an option 703 for overriding option 701. When option 701 is selected alerts are provided only for urgent messages. Selection of option 701 further causes filtering condition 140 to be generated at block 201 of method 200, and stored in memory device 124. When option 703 is selected, alerts are also provided for replied to urgent transmitted message regardless of whether the reply is tagged as urgent or not. Hence, when option 703 is selected, filtering override condition 142 is generated at block 203 of method 200, and stored in memory device 124. Further, when a non-urgent reply to an urgent e-mail is received, alert device 127 is triggered to provide an alert of the non-urgent reply, regardless of whether the response is to be filtered according to selectable option 701 and/or data 140.

Selecting option 701 can further cause an urgent inbox to be provided in representation 601. For example, returning to FIG. 6, each of lines 611 corresponds to either an urgent e-mail or a reply to an urgent e-mail. For example, line 611a corresponds to an urgent e-mail from "Ed Jones", and indicated as urgent in representation 601 in field 608 by an exclamation point "!". Lines, 611c-611g are similar to line 611a. However, line 611b corresponds to a reply to an urgent e-mail (e.g. the message described above with reference to FIG. 4), the reply NOT tagged as "Urgent". As such, with option 701 selected, the e-mail corresponding to line 611b would nominally not be provided; however as option 703 is selected, the message filter enabled with option 701 is overridden, and line 611b is provided. It is appreciated that as the e-mail corresponding the line 611b is NOT tagged as urgent, field 608 for line 611b is empty.

Attention is next directed to line 611h which corresponds to an e-mail having the subject "Re: Re: Your Sales Figures". It is appreciated that the e-mail corresponding to line 611h is associated with an urgent reply to an e-mail associated with line 611d. In other words, an e-mail having the subject "Your Sales Figures" was received and tagged as urgent; though not depicted, an e-mail tagged as urgent was transmitted in response, and a non-urgent reply was received in response to the transmitted urgent e-mail. Hence, first message 104 can comprise a first urgent message in a thread or a later urgent message in a thread; regardless, a reply to first message 104 is provided in representation 601.

Further, an icon 650 is provided as an alert to indicate that new message has been received: even though the e-mail corresponding to line 611h is not urgent, and option 701 has been selected, alert device 127 (in this implementation, display device 126 comprises alert device 127) is triggered to provide an alert of the e-mail corresponding to line 611h in the form of icon 650 as the e-mail is a response to an urgent transmitted e-mail.

In some implementations, the filter conditions represented by conditions 140, 142 can also determine which folder in data structure 602 a given e-mail is stored. For example, all e-mails can be stored in the "Inbox" folder in data structure 602. Alternatively, when option 701 is selected, only e-mails that meet condition 140 and filter override condition 142 can be stored in the "Inbox" folder, with all other e-mails stored in the "Non-Urgent" folder. Alternatively, all e-mails can be stored in the "Inbox" folder, however selecting option 701 causes the "Urgent" folder to be provided in representation 601 rather than the "Inbox" folder.

It is appreciated that data structure 602 can be stored in memory device 124. However in implementations where device 101 is a client device in a client-server environment, data structure 602, as well as conditions 140, 142 and application 144 can be stored and implemented in a server accessed by device 101.

It is further appreciated that while implementations have been described with regards to messages 104, 107 comprising e-mails, in other implementations, messages 104, 107 can comprise any suitable messages, including but not limited to at least one of an e-mail, a text message, an SMS (Short Message Service) message, an MMS message (Multimedia Messaging Service), and a telephony message. In other words, any message which can be tagged as urgent, and to which a response can be received is included in present implementations. For example, in a VoIP (Voice Over Internet Protocol) environment, telephony messages can be tagged as urgent; when a called party is initially not reachable, but the called party later responds, non-urgently, to a voice message associated with a non-urgent call, the responding call can cause a suitable alert device (e.g. a ringer, a speaker or the like) to provide an alert, regardless of whether the communication device receiving the call is set to provide alerts only for urgent calls.

Further, while overrides for filtering of urgent messages have been described, any override for any suitable type of message filtering is within the scope of present implementations. For example, filters based subject, sender and/or recipient are also within the scope of present implementations, and as well as overrides thereof. For example, if an e-mail sent to a first recipient is transmitted from device 101, and the first recipient then forwards that e-mail to a second recipient, who then replies to the e-mail, a filter which excludes e-mails from the second recipient but includes e-mails from the first recipient can be overridden using condition 142 as the original e-mail was transmitted to the first recipient.

Various advantages will now be apparent. For example, method 200 provides a mechanism for dynamic filtering of messages such that alerts to replies to urgent messages (and the like) are provided regardless of their urgency level (and the like). This ensures that alerts are provided for situations where alerts are desired and important messages are not discarded or ignored. In particular, when device 101 comprises a mobile electronic device with limited screen area, and alert device 127 comprises a visual, aural and/or vibratory alert device that is not a display and display based alerts may not attract the required attention, present implementations ensure that alert device 127 is controlled according to dynamic criteria such that alerts are provided in a manner that is attention grabbing, for receipt of messages for which alerts would not nominally be provided, but nonetheless might require immediate attention.

Those skilled in the art will appreciate that in some implementations, the functionality of device 101 can be implemented using pre-programmed hardware or firmware elements (e.g., application specific integrated circuits (ASICs), electrically erasable programmable read-only memories (EEPROMs), etc.), or other related components. In other implementations, the functionality of device 101 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the implementations, and that the above implementations and examples are only illustrations of one or more implementations. The scope, therefore, is only to be limited by the claims appended hereto.

What is claimed is:

1. A method comprising:
   transmitting a first message from a communication device to a communication network via a communication interface, said first message associated with a filtering override condition stored at a memory, said communication device comprising a processor, said memory, said communication device and an alert device;
   storing, at said memory, an identifier of said first message in a white list of identifiers of messages for which alerts for responses are to be generated regardless of any message filters that prevent alerts for from being provided for the responses;
   receiving, at the communication device, a second message from said communication network via said communication interface, said second message meeting a filtering condition stored in said memory such that said alert device is not triggered to provide an alert of second message;
   determining that said second message is received in response to said first message associated with said filtering override condition; and, in response,
   triggering said alert device to provide said alert of said second message, said alert of said second message different from alerts associated with said first message.

2. The method of claim 1, further comprising generating said filtering override condition using a graphic user interface (GUI) for configuring filtering conditions.

3. The method of claim 1, further comprising tagging said first message with an indication that said first message is associated with said filtering override condition.

4. The method of claim 3, wherein said determining that said second message is received in response to said first message associated with said filtering override condition comprises determining that said second message comprises said indication.

5. The method of claim 4, wherein said second message comprises said indication in at least one of metadata, text in said second message, and in header data.

6. The method of claim 1, wherein said determining that said second message is received in response to said first message associated said filtering override condition comprises determining that said second message is associated with said identifier stored in said white list.

7. The method of claim 1, wherein said identifier comprises at least one of a message identifier, a thread identifier and a subject line of said first message.

8. The method of claim 1, wherein said first message comprises at least one of an e-mail, a text message, an SMS (Short Message Service) message, an MMS message (Multimedia Messaging Service), and a telephony message.

9. The method of claim 1, wherein said communication device comprises a mobile communication device.

10. A communication device comprising:
    a processor, a memory, a communication interface and an alert device, said processor configured to:
    transmit a first message to a communication network via said communication interface, said first message associated with a filtering override condition stored at said memory;
    store, at said memory, an identifier of said first message in a white list of identifiers of messages for which alerts for responses are to be generated regardless of any message filters that prevent alerts for from being provided for the responses;
    receive a second message from said communication network via said communication interface, said second message meeting a filtering condition stored in said memory such that said alert device is not triggered to provide an alert of second message;
    determine that said second message is received in response to said first message associated with said filtering override condition; and, in response,
    trigger said alert device to provide said alert of said second message, said alert of said second message different from alerts associated with said first message.

11. The communication device of claim 10, wherein said processor is further configured to generate said filtering override condition using a graphic user interface (GUI) for configuring filtering conditions.

12. The communication device of claim 10, wherein said processor is further configured to tag said first message with an indication that said first message is associated with said filtering override condition.

13. The communication device of claim 12, wherein to determine that said second message is received in response to said first message associated with said filtering override condition, said processor is further configured to determine that said second message comprises said indication.

14. The communication device of claim 13, wherein said second message comprises said indication in at least one of metadata, text in said second message, and in header data.

15. The communication device of claim 1 wherein to determine that said second message is received in response to said first message associated said filtering override condition, said processor is further configured to determine that said second message is associated with said identifier stored in said white list.

16. The communication device of claim 1, wherein said identifier comprises at least one of a message identifier, a thread identifier and a subject line of said first message.

17. The communication device of claim 10, wherein said first message comprises at least one of an e-mail, a text message, an SMS (Short Message Service) message, an MMS message (Multimedia Messaging Service), and a telephony message.

18. The communication device of claim 10, wherein said communication device comprises a mobile communication device.

19. The communication device of claim 10, wherein said display device comprises said alert device.

20. A computer program product, comprising a non-transitory computer usable medium having a computer readable program code adapted to be executed to implement a method at a communication device comprising a processor, a memory, a communication interface and an alert device, the method comprising:

transmitting a first message from said communication device to a communication network via said communication interface, said first message associated with a filtering override condition stored at said memory;

storing, at said memory, an identifier of said first message in a white list of identifiers of messages for which alerts for responses are to be generated regardless of any message filters that prevent alerts for from being provided for the responses;

receiving, at said communication device, a second message from said communication network via said communication interface, said second message meeting a filtering condition stored in said memory such that said alert device is not triggered to provide an alert of second message;

determining that said second message is received in response to said first message associated with said filtering override condition; and, in response, triggering said alert device to provide said alert of said second message, said alert of said second message different from alerts associated with said first message.

\* \* \* \* \*